(12) United States Patent
Bueno et al.

(10) Patent No.: US 8,031,633 B2
(45) Date of Patent: Oct. 4, 2011

(54) VIRTUAL NETWORK ARCHITECTURE FOR SPACE DATA PROCESSING

(75) Inventors: David R. Bueno, Pinellas Park, FL (US); Clifford E. Kimmery, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 911 days.

(21) Appl. No.: 11/838,023

(22) Filed: Aug. 13, 2007

(65) Prior Publication Data

US 2009/0046733 A1     Feb. 19, 2009

(51) Int. Cl.
*H04L 12/24* (2006.01)

(52) U.S. Cl. .................... 370/254; 370/401; 709/226

(58) Field of Classification Search ........... 370/252, 370/254, 395.41, 397, 399, 400, 401, 409; 709/220–226
See application file for complete search history.

(56) References Cited

U.S. PATENT DOCUMENTS

| | | | |
|---|---|---|---|
| 5,446,736 A | 8/1995 | Gleeson et al. | |
| 5,467,348 A * | 11/1995 | Fujii et al. ............... | 370/468 |
| 5,627,829 A | 5/1997 | Gleeson et al. | |
| 5,764,740 A * | 6/1998 | Holender .................. | 379/112.05 |
| 5,859,981 A * | 1/1999 | Levin et al. .............. | 709/238 |
| 5,933,422 A * | 8/1999 | Kusano et al. ............ | 370/331 |
| 6,331,986 B1 | 12/2001 | Mitra et al. | |
| 6,353,594 B1 | 3/2002 | Tooker et al. | |
| 6,427,173 B1 | 7/2002 | Boucher et al. | |
| 6,609,153 B1* | 8/2003 | Salkewicz ................ | 709/223 |
| 6,807,169 B2 | 10/2004 | Mattathil | |
| 7,124,205 B2 | 10/2006 | Craft et al. | |
| 7,197,546 B1 | 3/2007 | Bagga et al. | |
| 7,212,543 B1 | 5/2007 | Arwald et al. | |
| 7,379,454 B2 | 5/2008 | Ogasawara et al. | |
| 2002/0097725 A1 | 7/2002 | Dighe et al. | |
| 2002/0118646 A1* | 8/2002 | Saint Etienne ............ | 370/235 |
| 2002/0159456 A1 | 10/2002 | Foster et al. | |
| 2004/0081203 A1 | 4/2004 | Sodder et al. | |
| 2004/0179476 A1* | 9/2004 | Kim et al. ................. | 370/230 |
| 2004/0225490 A1 | 11/2004 | Douady et al. | |
| 2004/0264503 A1 | 12/2004 | Draves, Jr. | |
| 2005/0022143 A1 | 1/2005 | Butts et al. | |
| 2005/0220143 A1 | 10/2005 | DelRegno et al. | |

(Continued)

FOREIGN PATENT DOCUMENTS

| EP | 1484897 | 12/2004 |
|---|---|---|
| EP | 1494408 | 1/2005 |
| WO | 0143456 | 6/2001 |

OTHER PUBLICATIONS

Di Crescenzo, "A Pragmatic Pproach to Evaluating NoC Strategies", "http://www.edatechforum.com/journal/june2007/pragmatic.cfm", Jun. 2007, pp. 1-6, Publisher: Arteris.

(Continued)

*Primary Examiner* — Hassan Phillips
*Assistant Examiner* — Duc Duong
(74) *Attorney, Agent, or Firm* — Fogg & Powers LLC

(57) ABSTRACT

An adaptable virtual network system comprises a plurality of network elements and a plurality of virtual links. Each network element is communicatively coupled to at least one other network element via at least one physical link. At least one physical link comprises at least two virtual links. The adaptable virtual network system supports at least two virtual networks, each virtual network comprising at least one virtual link communicatively coupling at least two network elements.

19 Claims, 7 Drawing Sheets

U.S. PATENT DOCUMENTS

| | | | |
|---|---|---|---|
| 2006/0092976 A1* | 5/2006 | Lakshman et al. | 370/469 |
| 2006/0133390 A1* | 6/2006 | Sreekantiah et al. | 370/401 |
| 2006/0153070 A1 | 7/2006 | DelRegno et al. | |
| 2006/0203747 A1 | 9/2006 | Wright et al. | |
| 2006/0206218 A1 | 9/2006 | Glanzer et al. | |
| 2007/0136495 A1 | 6/2007 | Boucher et al. | |

OTHER PUBLICATIONS

Hogie, Keith et al., "Using Standard Internet Protocols and Application in Space", "Computer Networks", 2004, pp. 603-650, No. 47, Publisher: Elsevier B.V., Published in: Lanham-Seabrook, MD.

* cited by examiner

VIRTUAL NETWORK ARCHITECTURE FOR SPACE DATA PROCESSING

CROSS REFERENCE TO RELATED APPLICATIONS

This application is related to U.S. patent application Ser. No. 11/838,013 having a title of "COMMON PROTOCOL AND ROUTING SCHEME FOR SPACE DATA PROCESSING NETWORKS".

BACKGROUND

Traditionally, space processing systems are designed for a one-to-one mapping of logical networks to physical networks, with each physical network being presented to the user as a single logical network. Each physical (and hence, logical) network is capable of running a single network protocol over a single network topology, while possibly allowing some protocol-specific variants. There is currently no existing method to partition a single physical network into multiple isolated logical networks for usability, performance, or isolation purposes without resorting to separate physical networks. For space processing systems, employing a dedicated physical network for each logical network in the system is especially costly both in terms of financial resources and the long lead time involved in designing a flight-worthy system. Creating multiple physical networks increases both the complexity and size of the design, and requires designers follow multiple sets of design practices when constructing the system architecture.

SUMMARY

In one aspect, an adaptable virtual network system comprising a plurality of network elements and a plurality of virtual links. Each network element is communicatively coupled to at least one other network element via at least one physical link and at least one physical link comprises at least two virtual links. The adaptable virtual network system supports at least two virtual networks with each virtual network comprising at least one virtual link communicatively coupling at least two network elements.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present application describes an adaptable virtual network system (also referred to herein as "the system") and methods of forming and re-configuring the adaptable virtual network system so that the user of a data processing system, such as a space processing system, is able to partition a single physical network into multiple logical networks. These logical networks are referred to herein as "virtual networks." The user may define the virtual links within the physical links of the adaptable virtual network system to be members of the virtual networks.

The bandwidth of each virtual link in the virtual network is dependent on the percentage of bandwidth of the physical link that has been allocated to the virtual network. Thus, each physical link in the system may be a member of multiple virtual networks (or zero virtual networks). Each virtual link is a member of exactly one virtual network. Each virtual network in the system is a collection of virtual links forming a connected graph, with the same network protocol being run on each virtual link. The different virtual networks in the system can run different network protocols over their virtual links. Both circuit-switched and packet-switched protocols can be run by the system. Each virtual network then appears to the user as a dedicated logical/physical network in terms of usability, performance, and fault isolation. Thus, each virtual network presents to the user a unique level of guaranteed bandwidth and Quality of Service, while also providing traffic and fault isolation from the other virtual networks. A series of virtual links that connect two or more non-neighboring endpoints form a virtual network between the connected non-neighboring endpoints. The adaptable virtual network is created by employing virtual link switching of arbitrary network traffic at the lowest levels of the network protocol stack. As part of the virtual network definition process, virtual links are created in all point-to-point physical links that are members of the adaptable virtual network system. Each virtual link is allocated a user-defined percentage of the physical link's total bandwidth. The configuration is implemented by writing to configuration registers in the network endpoints and switch devices.

Figure 1:
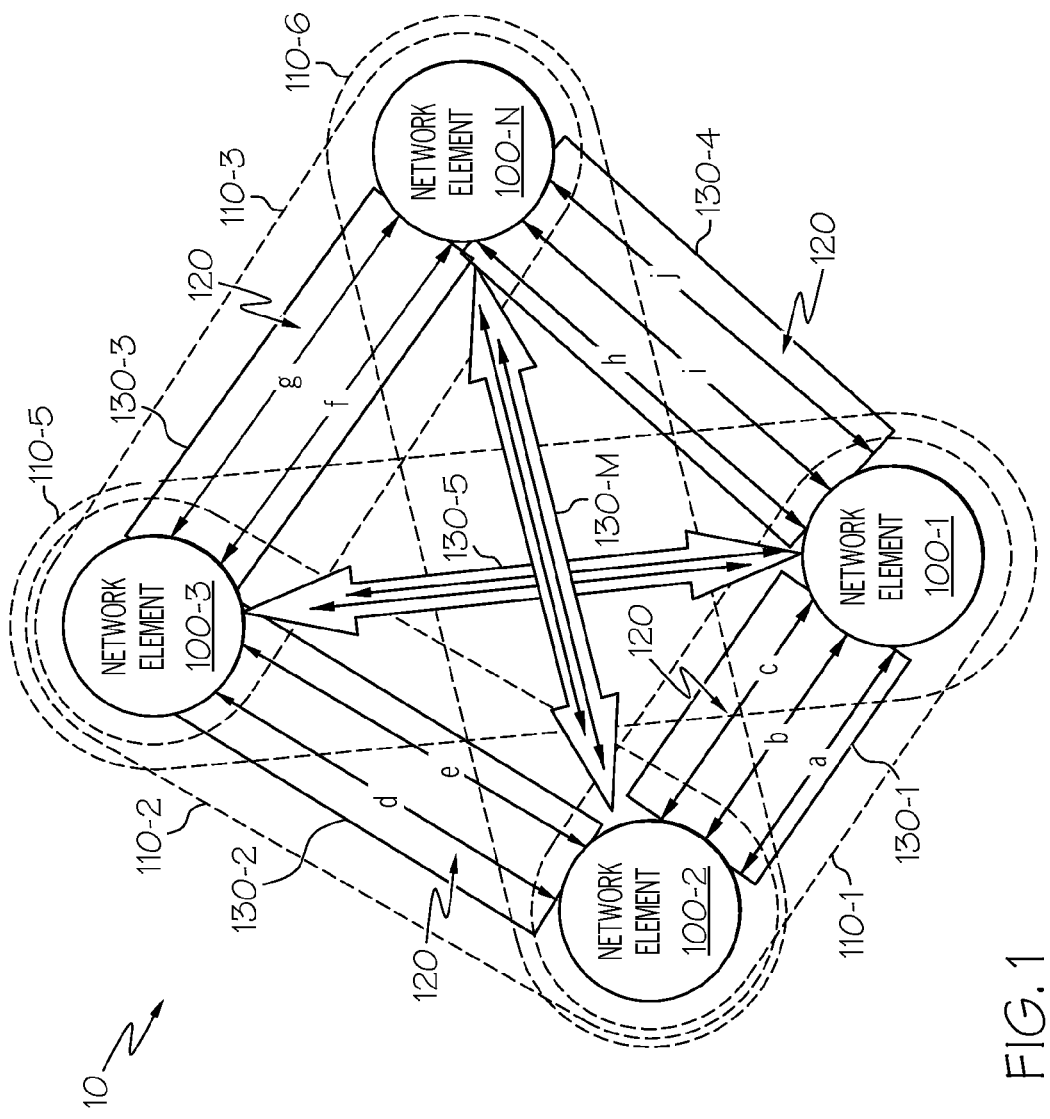
FIGS. 1-3 are block diagrams of embodiments of adaptable virtual network systems in accordance with the present invention.
Figure 2:
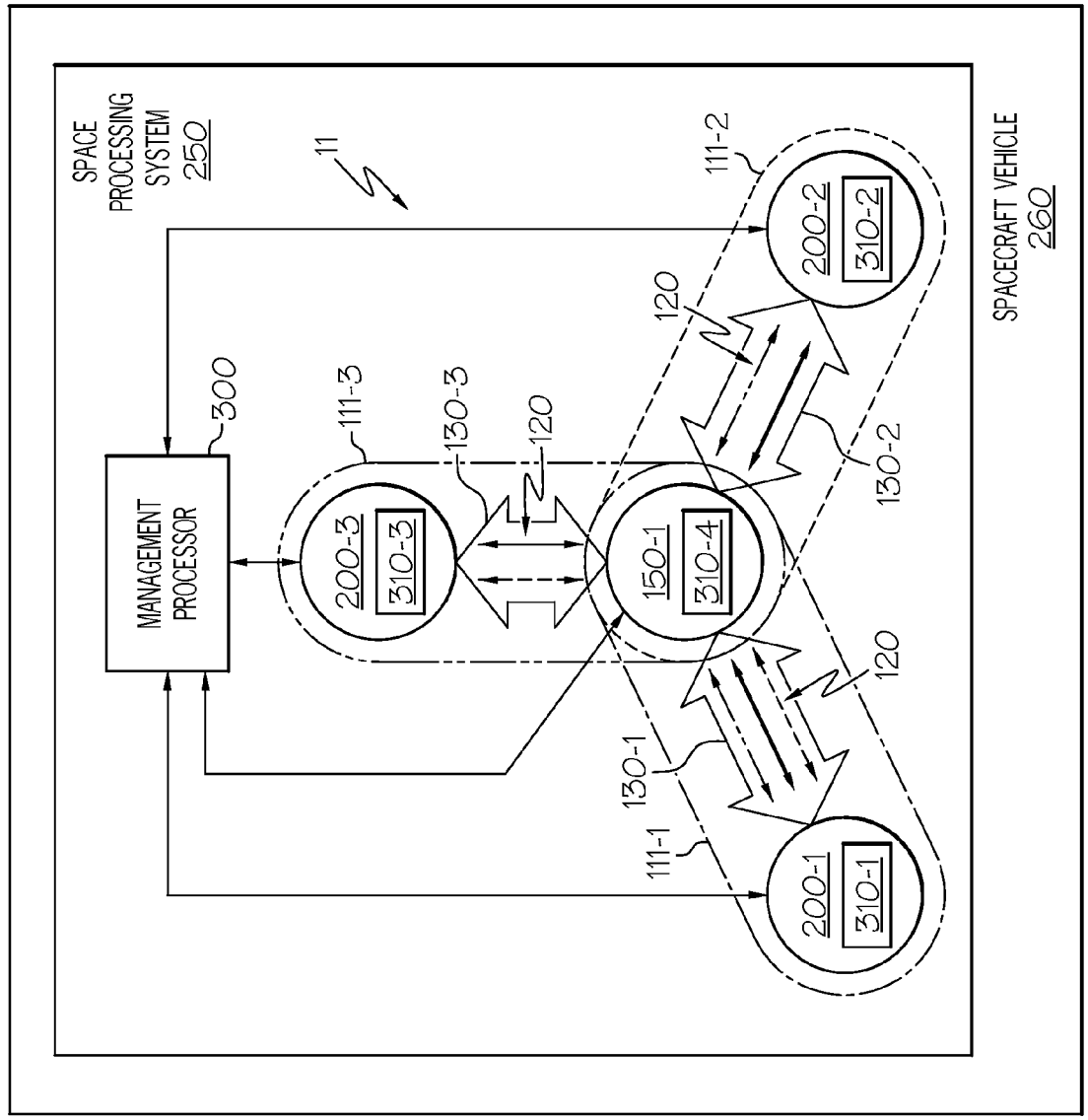
Figure 3:
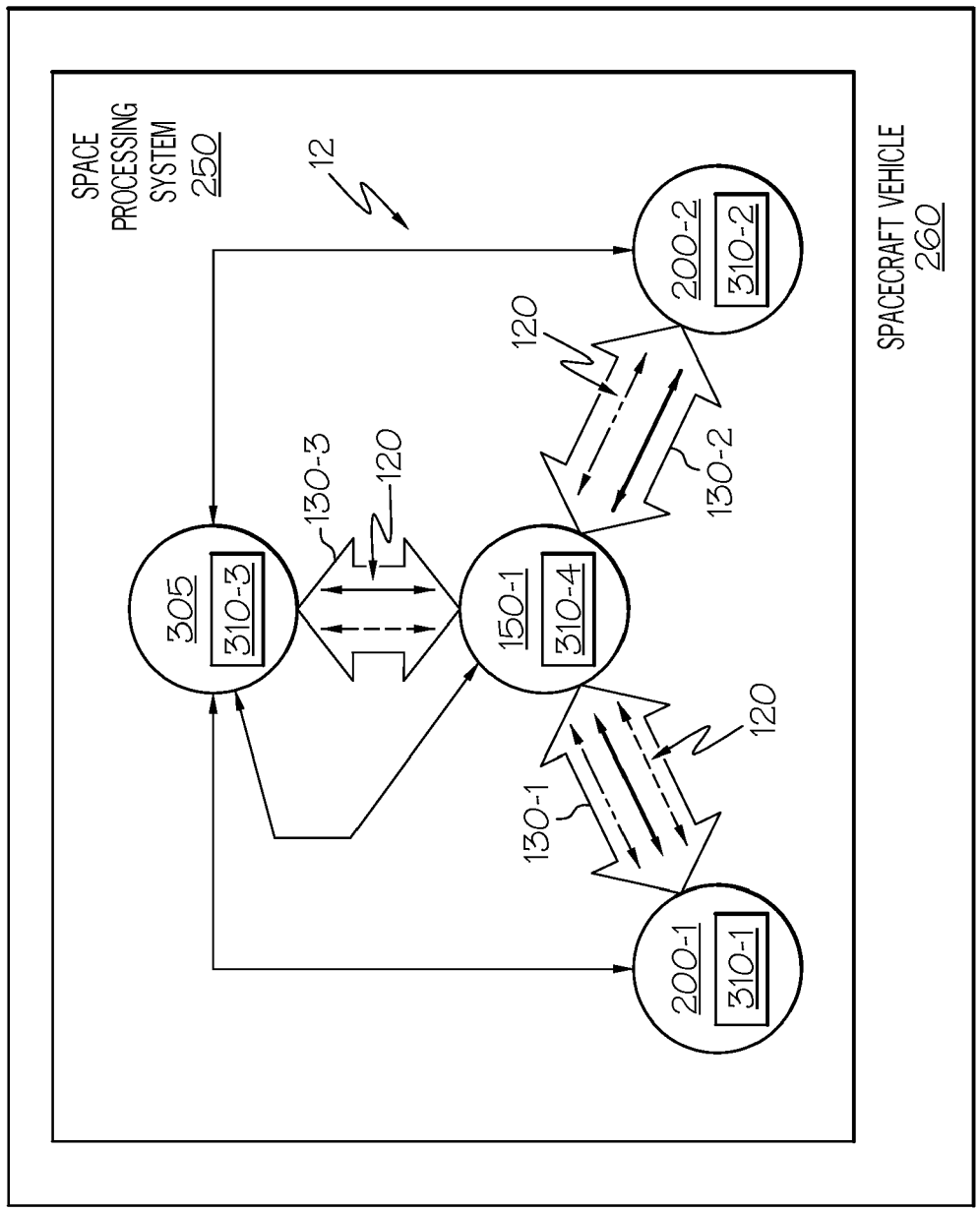

FIGS. 1-3 are block diagrams of embodiments of adaptable virtual networks systems in accordance with the present invention. Each adaptable virtual network system comprises a plurality of network elements and a plurality of virtual links. Each network element is communicatively coupled to at least one other network element via at least one physical link. At least one physical link comprises at least two virtual links. In one implementation of this embodiment, each physical link comprises at least one virtual link. The adaptable virtual network system supports at least two virtual networks. Each virtual network comprises at least one virtual link communicatively coupling at least two network elements. In the virtual networks that include two or more virtual links, all the virtual links in a respective virtual network run the same upper-level network protocol. The virtual links in the physical links can be modified by a management processor. The management processor modifies the virtual links in the adaptable virtual network system based on feedback from the adaptable virtual network system and/or based on input from a system user.

FIG. 1 is a block diagram of one embodiment of an adaptable virtual network system 10. The adaptable virtual network system 10 comprises a plurality of network elements 100 (1-N). As shown in FIG. 1, the plurality of network elements 100 (1-N) that comprise the adaptable virtual network 10 are directly communicatively coupled to each other via a physical link 130 (1-M) in a point-to-point mesh configuration. Each physical link 130 (1-M) comprises at least one virtual link represented generally by the numeral 120-$i$. For example, physical link 130-1 includes virtual links 120-$a$, 120-$b$, and 120-$c$, while physical link 130-2 includes virtual links 120-$d$ and 120-$e$. In this manner, the adaptable virtual network system 10 includes a plurality of virtual links 120. The virtual links in the physical links 130-5 and 130-6 are not each labeled for ease of viewing the drawing.

In all embodiments of the adaptable virtual network systems described herein, at least one physical link 130-$k$ includes at least two virtual links 120-$p$ and 120-$q$. Pairs of network elements are formed between directly connected network elements. For example, network element 100-1 and 100-2 form pair 110-1, while network elements 100-2 and 100-3 form pair 110-2, and network elements 100-1 and 10-3 form pair 110-5, and so forth as shown in FIG. 1. Each physical link 130 (1-M) has physical link bandwidth based at least in part on the bandwidth of the network elements in the pair. The virtual links 120-$p$ within each physical link 130-$k$ are formed by partitioning the physical link bandwidth of the physical link 130-$k$ communicatively coupling the two network elements 100-$i$ and 100-$j$. In this embodiment of the adaptable virtual network system, each virtual link 120-$i$ is a virtual network. The plurality of virtual links 130 (1-P) together with the plurality of network elements 100 (1-N) form the adaptable virtual network system 10. In one implementation of this embodiment, the network elements 100 (1-N) comprise a tightly coupled embedded system.

FIG. 2 is a block diagram of one embodiment of an adaptable virtual network system 11. The adaptable virtual network system 11 is part of a space processing system 250 in spacecraft vehicle 260. The adaptable virtual network system 11 includes a management processor 300 that is communicatively coupled to the plurality of network elements 200 (1-3) and 150-1. The network elements 200 (1-3) are endpoints of the adaptable virtual network system 11 and the network element 150-1 is a switch 150-1. In other embodiments, two or more of the network elements are switches. As shown in FIG. 2, each network element 200 (1-3) is communicatively coupled to the switch 150-1 via a respective physical link 130 (1-3). The network element 200-1 and the switch 150-1 form a pair 111-1 of network elements. The network element 200-2 and the switch 150-1 form a pair 111-2 of network elements. The network element 200-3 and the switch 150-1 form a pair 111-3 of network elements. The management processor 300 sends input to the configuration registers 310 (1-4) in the respective network element 200 (1-3) and 150-1 in order to allocate the bandwidth to the virtual links 120 in a respective one of the communicatively coupled physical links 130 (1-3). Virtual networks are formed by combining virtual links (within the different physical links) running on the same upper-level network protocol. For ease of viewing the drawing, the virtual links running on the same upper-level network protocol are indicated by the same style of double arrow. In one implementation of this embodiment, the adaptable virtual network system 11 is part of a circuit switching virtual network and all the virtual links in the virtual network have the same bandwidth. In another implementation of this embodiment, the adaptable virtual network system 11 is part of a packet switching network and the virtual links communicatively coupled in the virtual network do not all have the same bandwidth.

The management processor 300 is configured to segment the physical link bandwidth for each of the pairs of network elements. Each of the plurality of network elements 200 (1-3) includes a configuration register 310 (1-3). The management processor 300 is configured to segment the bandwidth for each of the pairs 111 (1-3) of network elements 200 (1-3) and 150-1 based on received input from a network user or a network designer. The management processor 300 is configured to re-segment the bandwidth for at least one of the pairs 111 (1-3) of network elements 200 (1-3) and 150-1 based on modifying input received from the network user or a network designer. In this manner, the virtual links that communicatively couple a pair of network elements at a first time differs from the virtual links that communicatively couple the pair of network elements at a later time after the management processor has re-segmented the bandwidth for at least one of the pairs of network elements. In one implementation of this embodiment, network elements 200-1, 200-2, 200-3, and 150-1 in the space processing system 250 comprise a tightly coupled embedded system.

FIG. 3 is a block diagram of one embodiment of an adaptable virtual network system 12. Adaptable virtual network system 12 differs from adaptable virtual network system 11 in that the management processor 300 of adaptable virtual network system 11 is included in the network element 305. The network element 305 is also referred to herein as "management-processor-network element 305." The management-processor-network element 305 is communicatively coupled to the network elements 200-1, 200-2, and 150-1. In one implementation of this embodiment, the management-processor-network element 305 is communicatively coupled to send input to the configuration registers 310 (1-4) in the respective network elements 200 (1-2) and 150-1 via the respective physical links 130 (1-3). In another implementation of this embodiment, the management-processor-network element 305 is communicatively coupled to the configuration registers 310 (1-4) in the respective network element 200 (1-2) and 150-1 via a communication link that is separate from the physical links 130 (1-3). The management processor 305 is configured to function in the manner described above with reference to the management processor 300 of FIG. 2.

Figure 4C:
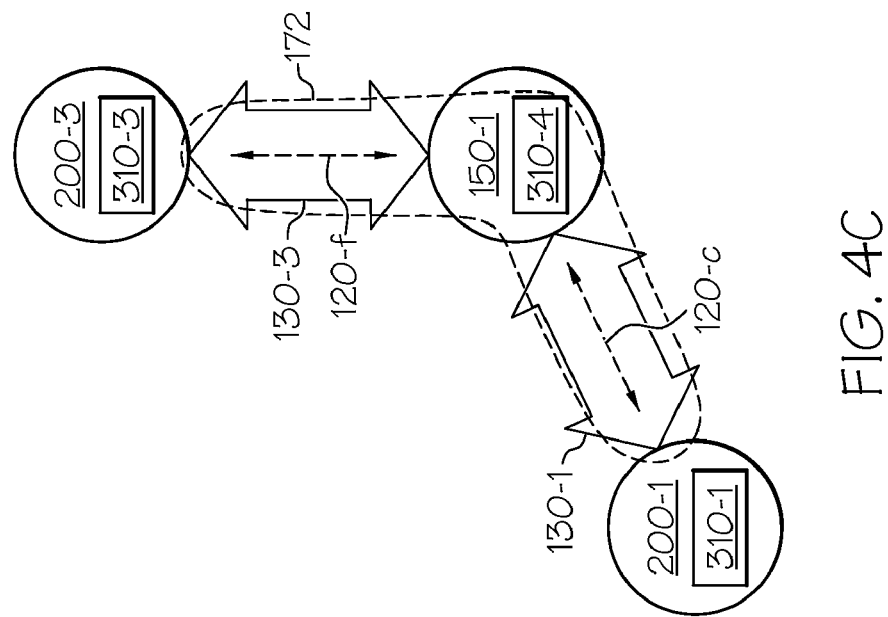
FIGS. 4A-4C are block diagrams of embodiments of virtual networks in the adaptable virtual network system of FIG. 2 in accordance with the present invention.
Figure 4A:
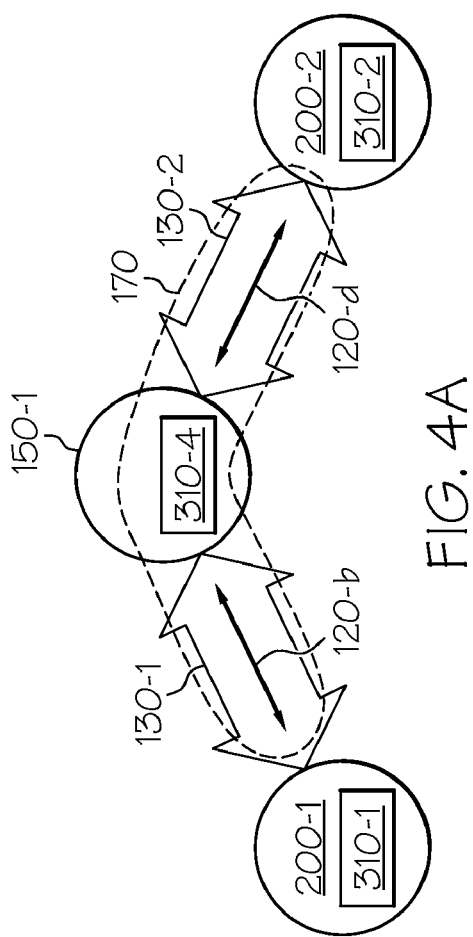
Figure 4B:
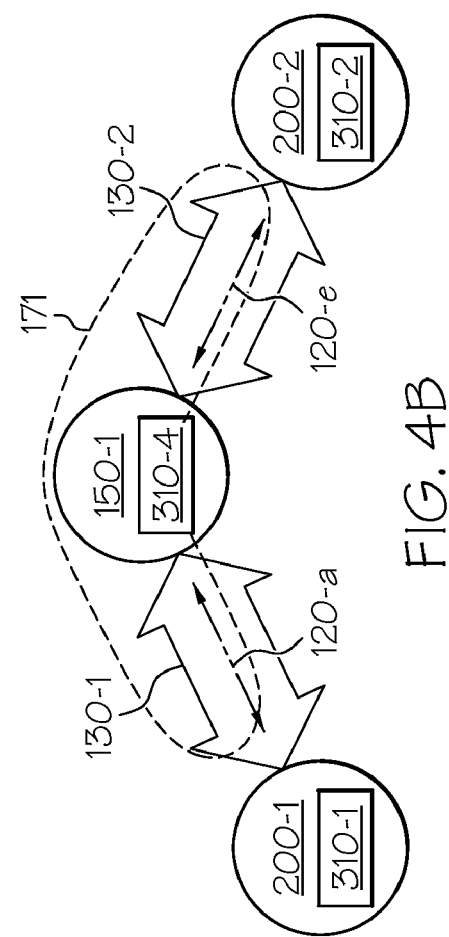

FIGS. 4A-4C are block diagrams of embodiments of virtual networks in the virtual network 11 of FIG. 2 in accordance with the present invention. The plurality of network elements 200 (1-3) are communicatively coupled to each other via at least one switch 150 and at least two of the plurality of virtual links 120-$i$ and 120-$j$ in at least two respective physical links 130-$p$ and 130-$q$. A virtual network is formed between two network elements that are communicatively coupled via the switch and at least two virtual links.

FIG. 4A shows the virtual network represented generally by the numeral 170 that includes the virtual link 120-$b$ in physical link 130-1 and the virtual link 120-$d$ in physical link 130-2. Thus the network elements 200-1 and 200-2 are communicatively coupled to each other by virtual links 120-$b$ and 120-$d$ in respective physical links 130-1 and 130-2. The virtual links 120-$b$ and 120-$d$ run the same upper-level network protocol. In one implementation of this embodiment, the virtual links 120-$b$ and 120-$d$ run the same upper-level network protocol at the same bandwidth.

FIG. 4B shows the virtual network represented generally by the numeral 171 that includes the virtual link 120-$a$ in physical link 130-1 and the virtual link 120-$e$ in physical link 130-2. Thus the network elements 200-1 and 200-2 are communicatively coupled to each other by virtual links 120-*a* and 120-*e* in respective physical links 130-1 and 130-2. The virtual links 120-*a* and 120-*e* run the same upper-level network protocol. In one implementation of this embodiment, the bandwidth of virtual links 120-*a* and 120-*e* are different from the bandwidth of 120-*b* and 120-*d*.

FIG. 4C shows the virtual network represented generally by the numeral 172 that includes the virtual link 120-*c* in physical link 130-1 and the virtual link 120-*f* in physical link 130-3. Thus the network elements 200-1 and 200-3 are communicatively coupled to each other by virtual links 120-*c* and 120-*f* in respective physical links 130-1 and 130-3. The virtual links 120-*c* and 120-*f* run the same upper-level network protocol at the same bandwidth. In another implementation of this embodiment, the bandwidth of the virtual links 120-*c* and 120-*f* are different from the bandwidth of the virtual links 120-*b* and 120-*d* and from the bandwidth of virtual links 120-*a* and 120-*e*. The virtual networks 170, 171 and 172 combined form at least a part of the adaptable virtual network system 11.

Figure 5A:
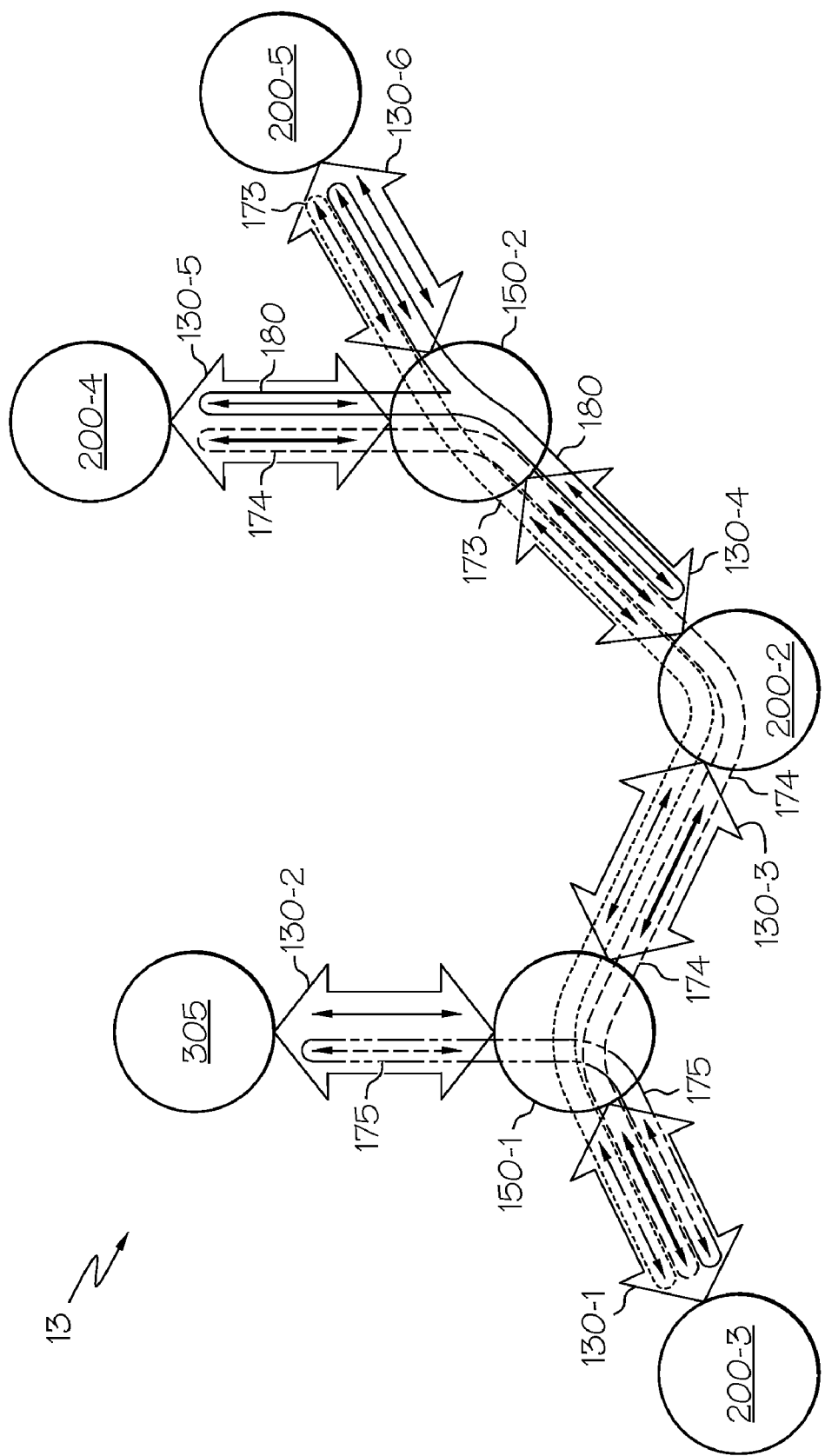
FIGS. 5A-5B are block diagrams of embodiments of virtual networks in an adaptable virtual network system at two different times in accordance with the present invention.
Figure 5B:
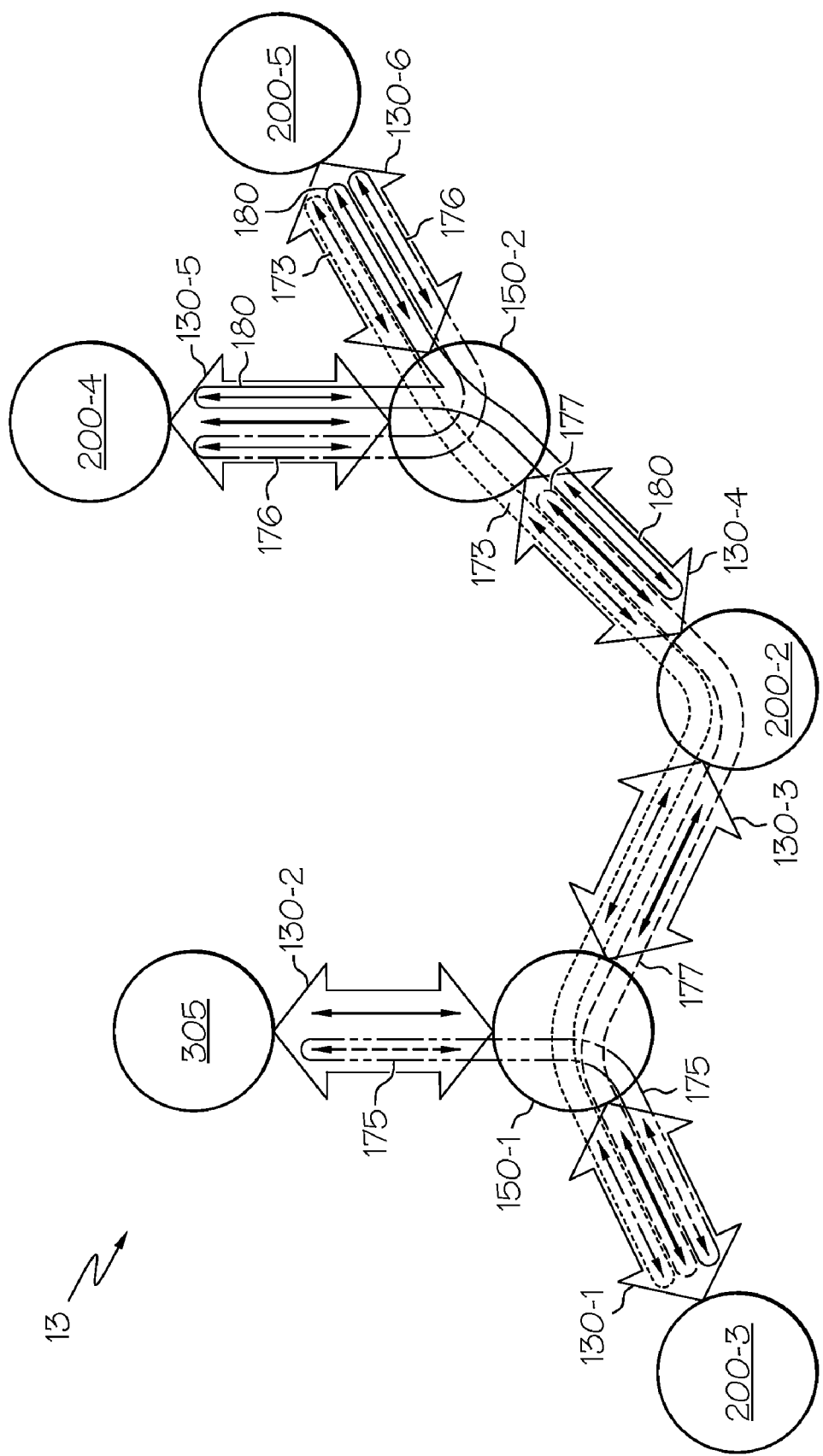

FIGS. 5A-5B are block diagrams of embodiments of virtual networks in an adaptable virtual network system 13 at two different times in accordance with the present invention. The virtual links communicatively coupling the pair of network elements at a first time differs from the virtual links communicatively coupling the pair of network elements at a second time. In FIG. 5A, the adaptable virtual network system 13 is shown at a first time to include virtual networks represented generally by the numerals 173, 174, 175 and 180. For ease of viewing the drawing, the virtual links running on the same upper-level network protocol are indicated by the same style of double arrow. Specifically, the virtual links in the virtual network 173 are represented by dash-double-dot arrows. The virtual links in the virtual network 174 are represented by solid bold arrows. The virtual links in the virtual network 175 are represented by dashed arrows. The virtual links in the virtual network 180 are represented by un-bold, solid arrows.

The virtual network 173 communicatively couples network element 200-3 to network element 200-5. The virtual network 173 includes virtual links in the physical links 130-1, 130-3, 130-4 and 130-6 that are communicatively coupled via the switch 150-1, the network element 200-2, and the switch 150-2. The virtual network 174 communicatively couples network element 200-3 to network element 200-4. The virtual network 174 includes virtual links in the physical links 130-1, 130-3, 130-4 and 130-5 that are communicatively coupled via the switch 150-1, the network element 200-2, and the switch 150-2. The virtual network 175 communicatively couples network element 200-3 to network element 305, which is also the management processor 305. The virtual network 175 includes virtual links in the physical links 130-1 and 130-2 that are communicatively coupled via the switch 150-1.

The virtual network 180 communicatively couples network element 200-2 to both network elements 200-4 and 200-5 via the switch 150-2. The virtual network 180 includes virtual links in the physical links 130-4, 130-5, and 130-5 that are communicatively coupled via the switch 150-2.

In FIG. 5B, the adaptable virtual network system 13 is shown at a second time. Adaptation of the network would be expected to occur due to some change in function or error condition, and therefore would occur at a relatively low rate. For example, hours, days or weeks can pass before the network is modified. In one implementation of this embodiment, the bandwidth segmentation of the physical links in the adaptable virtual network system is modified in response to a system reconfiguration for a portion of one network elements or the physical links in the adaptable virtual network system. In another implementation of this embodiment, the bandwidth segmentation of the physical links in the adaptable virtual network system is modified in response to a detected failure of a portion of one of the network elements or the physical links in the adaptable virtual network system.

The adaptable virtual network system 13 at the second time supports the virtual networks 173, 175, 180 and the virtual networks represented generally by the numerals 176 and 177. The virtual networks 173, 175, and 180 are as described above with reference to FIG. 5A. The virtual network 174 is truncated to form virtual network 177 since the physical link 130-5 has been modified and no longer supports the upper-level network protocol and bandwidth represented by the solid bold arrows. Thus, the virtual network 177 does not include the virtual link in the physical link 130-5 but ends at the switch 150-2. The virtual network 176 communicatively couples network element 200-4 to network element 200-5. The virtual network 176 includes virtual links in the physical links 130-5 and 130-6 that are communicatively coupled via the switch 150-2. The virtual links in the virtual network 176 are represented by solid thin arrows.

Figure 6:
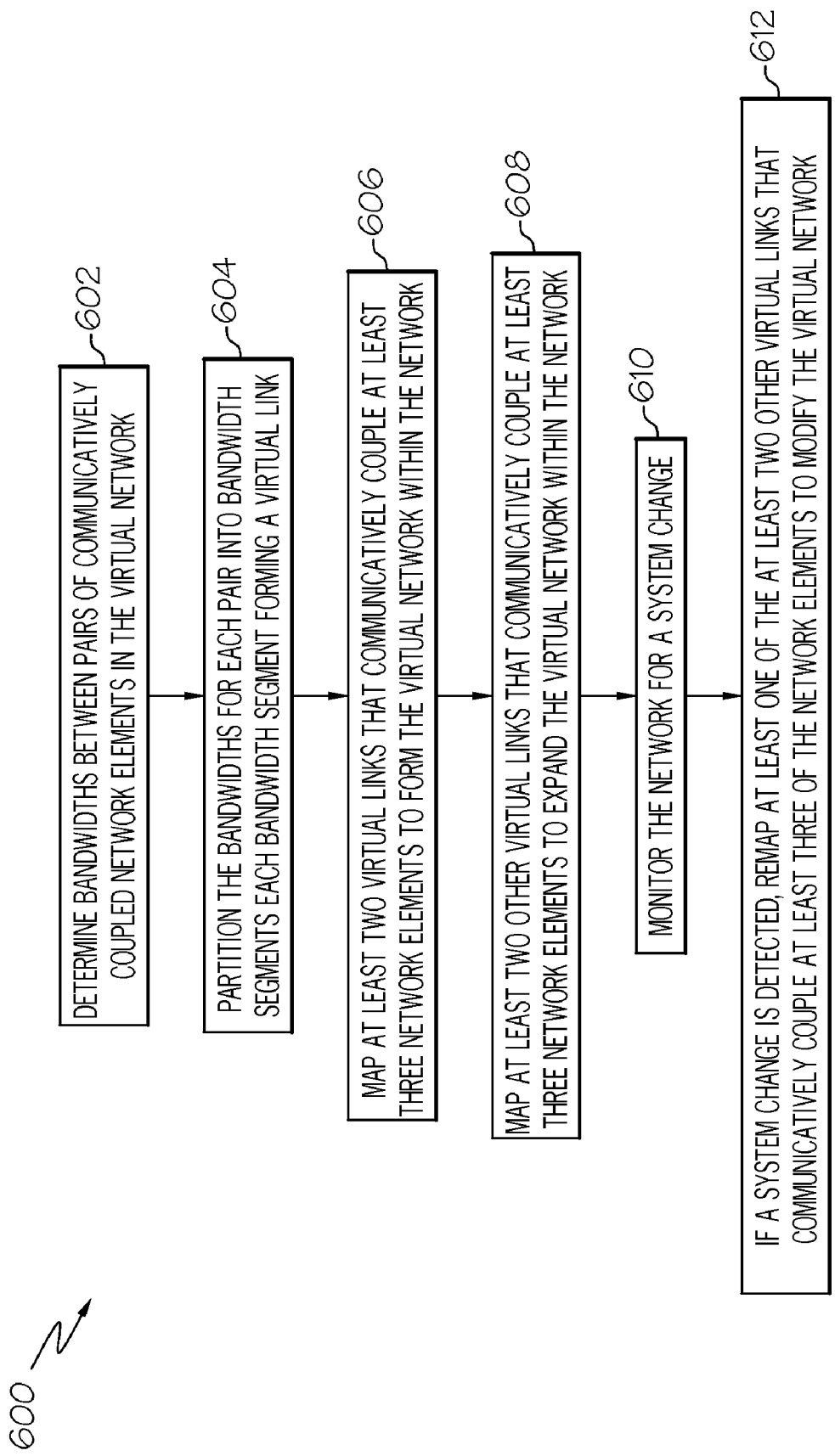
FIG. 6 is a flow diagram of one embodiment of a method to form a virtual network from a network in accordance with the present invention.

FIG. 6 is a flow diagram of one embodiment of a method 600 for forming a virtual network in a physical network comprising network elements in accordance with the present invention. In one implementation of this embodiment, the virtual network is an adaptable virtual network system as described above with reference to FIGS. 1-5B. The method 600 is described with reference to the network 11 of the space processing system 250 shown in FIGS. 2 and 5A, although it is to be understood that method 600 can be implemented using other embodiments of the virtual network as is understandable by one skilled in the art who reads this document.

At block 602, the management processor determines the bandwidths between pairs of communicatively coupled network elements in the physical network. In one implementation of this embodiment, management processor 300 determines the bandwidths between pairs 111 (1-3) of communicatively coupled network elements 200 (1-3) and 150-1 in the virtual network.

At block 604, the management processor partitions the bandwidths for each pair into bandwidth segments. Each bandwidth segment forms a virtual link between the communicatively coupled network elements in the pair. In one implementation of this embodiment, the management processor 300 partitions the bandwidth for the pair 111-1 into bandwidth segments that form the virtual links 120 (*a-c*), partitions the bandwidth for the pair 111-2 into bandwidth segments that form the virtual links 120 (*d-e*), and partitions the bandwidth for the pair 111-3 into bandwidth segments that form the virtual links 120 (*f-g*).

At block 606, the management processor maps at least two virtual links that communicatively couple at least three network elements to form the virtual network within the network. In one implementation of this embodiment, the management processor 300 maps the virtual link 120-*c*, which communicatively couples the network element 200-1 to the switch 150-1 and maps the virtual link 120-*f*, which communicatively couples the network element 200-3 to the switch 150-1 to form the virtual network 172 as shown in FIG. 4C. In another implementation of this embodiment, the management processor 300 maps the virtual links in physical links 130-4, 130-5, and 130-6 to communicatively couple the respective network elements 200-2, 200-4 and 200-5 to the switch 150-2 to form the virtual network 180 as shown in FIG. 5A. At block 608, the management processor maps at least two other virtual links that communicatively couple at least three network elements to expand the virtual network within the network. As defined herein, an expansion of the virtual network comprises 1) the addition of a new virtual link on a currently established virtual network, 2) the addition of an additional virtual network that includes a plurality of virtual links, and 3) the additional of a new virtual network that includes a single virtual link.

For example, to expand the exemplary embodiment described above with reference to block 604, the management processor 300 maps the virtual link 120-*a*, which communicatively couples the network element 200-1 to the switch 150-1 and maps the virtual link 120-*e*, which communicatively couples the switch 150-1 to the network element 200-2 to expand the virtual networks in the adaptable virtual network system 11 to include the virtual network 171 as shown in FIG. 4B.

At block 610, the management processor monitors the network for a system change. The system change can be a system configuration change in which the application being run over the network is changed. In another implementation of this embodiment, the system change can be a failure of a network element. In the latter case, the management processor 300 monitors the network 11 for a failure of the network elements 200 (1-3) and 150-1. At block 612, the management processor remaps at least one of the at least two other virtual links that communicatively couple at least three network elements to modify the virtual network, if a system change is detected. To continue with the exemplary case in which the virtual network 171 and 172 are established in the system 11, if the application being run over the network is changed, the virtual network 171 is no longer implemented and a new virtual network configuration better suited to the new application, such as virtual network 170 may be established.

The partitioning of the bandwidth can be implemented for any one of the available partitioning technologies. In one implementation of this embodiment, the bandwidth is partitioned according to wavelength in a wavelength division multiplexing. In another implementation of this embodiment, the bandwidth is partitioned according to time in a time division multiplexing. In yet another implementation of this embodiment, the bandwidth is partitioned according to frequencies in the radio frequency spectrum. Other methods of partitioning the bandwidth in the physical link are possible.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An adaptable virtual network system, comprising:
   a plurality of network elements, each network element communicatively coupled to at least one other network element via at least one physical link, wherein at least a portion of the plurality of network elements form an embedded system tightly coupled by shared memory and input/output resources; and
   a plurality of virtual links, wherein at least one physical link comprises at least two virtual links, wherein the adaptable virtual network system supports at least two virtual networks, wherein each of the at least one physical link communicatively couples a pair of network elements, each of the at least one physical link having a physical link bandwidth based at least in part on the bandwidth of the network elements in the pair, and wherein the plurality of virtual links within each of the at least one physical link are formed by partitioning the physical link bandwidth of the at least one physical link communicatively coupling the network elements in the pair, wherein the virtual links that comprise a virtual network run the same upper-level network protocol.

2. The adaptable virtual network of claim 1, wherein each physical link comprises at least one virtual link.

3. The adaptable virtual network system of claim 1, wherein at least one of the network elements is a switch, the adaptable virtual network system further comprising:
   a virtual network communicatively coupling two network elements via the switch, the virtual network including at least two of the plurality of virtual links in at least two respective physical links.

4. The adaptable virtual network system of claim 1, wherein at least one of the network elements is a switch, wherein pairs of the network elements each include at least one switch, and wherein the network elements in the pairs of network elements that are communicatively coupled to a common switch are communicatively coupled to each other by at least two of the plurality of virtual links in at least two respective physical links.

5. The adaptable virtual network system of claim 1, further comprising:
   a management processor configured to segment the physical link bandwidth for each of the pairs of network elements, wherein the plurality of network elements each include a configuration register.

6. The network of claim 5, wherein the management processor is at least one of the plurality of network elements.

7. The adaptable virtual network system of claim 1, further comprising:
   a management processor configured to segment the bandwidth for each of the pairs of network elements based on received input and to re-segment the bandwidth for at least one of the pairs of network elements based on received modifying input, wherein the virtual links communicatively coupling the pair of network elements at a first time differ from the virtual links communicatively coupling the pair of network elements at a second time.

8. The adaptable virtual network system of claim 7, further comprising:
   a virtual network communicatively coupling a first network element and a second network element, the virtual network comprising at least two of the plurality of virtual links in at least two respective physical links that communicatively couple a third network element between the first network element and the second network element, wherein the virtual network communicatively coupling the first and second network elements at a first time differs from the virtual network communicatively coupling the first and second network elements at a second time.

9. The adaptable virtual network system of claim 1, wherein each virtual network comprises at least two virtual links in two respective physical links coupling at least three network elements, the network further comprising:
   a management processor configured to partition the physical link bandwidth for each of the pairs of network elements based on received input and to re-partition the physical link bandwidth for at least one of the pairs of network elements based on received modifying input, wherein at least one of the virtual links that comprise the virtual network at a first time differs from the virtual links that comprise the virtual network at a second time.

10. The adaptable virtual network system of claim 1 wherein at least one of the network elements is a switch, wherein at least one of the network elements in the pair of network elements is a switch, and wherein network elements communicatively coupled to the same switch are communicatively coupled to each other by at least two of the plurality of virtual links in at least two respective physical links.

11. The adaptable virtual network system of claim 1, wherein the virtual networks each comprise at least two virtual links in two respective physical links coupling at least three network elements.

12. A method of forming a virtual network in a physical network comprising network elements, the method comprising:
  determining bandwidths between pairs of communicatively coupled network elements in an embedded system tightly coupled by shared memory and input/output resources for at least a portion of the pairs, wherein the network elements in each pair are communicatively coupled to each other by a physical link; and
  partitioning the bandwidths for each pair into bandwidth segments, based at least in part on a physical link bandwidth of the physical link communicatively coupling the network elements in the pair, wherein each bandwidth segment forms a virtual link between the communicatively coupled network elements in the pair, wherein the virtual links that comprise the virtual network run the same upper-level network protocol.

13. The method of claim 12, further comprising mapping at least two virtual links that communicatively couple at least three network elements to form the virtual network within the network.

14. The method of claim 13, the method further comprising mapping at least two other virtual links that communicatively couple at least three network elements to expand the virtual network within the network.

15. The method of claim 13, further comprising:
  monitoring the network for a system change; and
  remapping at least one of the at least two other virtual links that communicatively couple at least three network elements to modify the virtual network, if a system change is detected.

16. The method of claim 13, further comprising:
  remapping at least one of the at least two other virtual links that communicatively couple at least three network elements to modify the virtual network.

17. The method of claim 12, further comprising forming at least one virtual network comprising at least two virtual links in two respective physical links coupling at least three network elements.

18. An adaptable virtual network system, comprising:
  a plurality of network elements, each network element communicatively coupled to at least one other network element via at least one physical link, wherein at least a portion of the plurality of network elements form an embedded system tightly coupled by shared memory and input/output resources, and wherein at least one of the network elements is a switch; and
  a plurality of virtual links, wherein at least one physical link comprises at least two virtual links, the plurality of network elements and the plurality of virtual links supporting at least two virtual networks, wherein the virtual links that comprise a virtual network run the same upper-level network protocol.

19. The adaptable virtual network system of claim 18, wherein the virtual networks each comprise at least two virtual links in two respective physical links coupling at least three network elements.

* * * * *